Patented Apr. 12, 1927.

1,624,358

UNITED STATES PATENT OFFICE.

FERDINAND W. NITARDY, OF BROOKLYN, NEW YORK, ASSIGNOR TO E. R. SQUIBB AND SONS, OF NEW YORK, N. Y., A CORPORATION OF NEW YORK.

PRESERVATION OF OILS.

No Drawing.   Application filed January 21, 1924. Serial No. 687,619.

This invention relates to the preservation of oils, particularly castor oil and cod-liver oil, in a substantially tasteless and odorless condition.

The use of oils which have a disagreeable odor and taste is more or less restricted and numerous investigations have been conducted for the purpose of destroying the odor and taste of castor oil and other oils, in order that their use may not be disagreeable. For example, it is possible to remove the odor and taste from castor oil by various methods, of which the most practicable is vacuum distillation with steam. According to this method the oil is placed in a suitable vacuum pan and steam is caused to pass through the oil while the space within the vacuum pan is maintained under a reduced pressure so that the vapors arising from the oil are withdrawn immediately therefrom. The oil itself is not distilled but the more or less volatile elements which give it its nauseous odor and taste are removed to a substantial extent and the oil is thus rendered practically tasteless and odorless.

It is characteristic of oils which have been subjected to this and other treatments to render them tasteless and odorless that upon exposure to the atmosphere a reversion occurs and the taste and odor reappear in a relatively short time. No plausible explanation of this phenomenon can be set forth at this time, but presumably the result observed is caused by the oxygen of the atmosphere. It is the object of the present invention to avoid the reappearance of odor and taste in castor and similar oils after the latter have been subjected to special treatment to render them tasteless and odorless.

I have discovered that tasteless and odorless castor oil can be preserved for extended periods and substantially indefinitely in its tasteless and odorless state by preventing contact of the atmosphere therewith. This is accomplished in large storage containers by removing the air from the space above the oil and substituting therefor an inert gas such as nitrogen or carbon dioxide. The same expedient can be employed in preserving oils, such as castor oil, in the small receptacles used in supplying the product to the trade. However, these small containers are intended to be opened frequently and air will mix with the inert gas so that the preservation of the oil can be assured no longer than the container remains unopened.

I have also discovered that certain substances when added to the oil inhibit the return of the taste and odor thereto even though such substances are employed in relatively minute quantities so that they impart none of their characteristics to the oil. Some of these substances are reducing in nature, and it might be assumed that the effect is due to the ability of the added substances to absorb oxygen and thus prevent the action of oxygen upon the oil. Nevertheless it is true that certain other substances which are not ordinarily regarded as reducing agents can be used for the same purpose and in fact are preferable since they appear to exhibit the inhibiting effect to an even greater extent than certain reducing agents generally employed in chemical operations. These agents, as well as the reducing substances, may be regarded as inhibiting agents or negative catalyzers.

In the preferred embodiment of the invention I add to the oil which has been rendered tasteless and odorless a small amount of grain alcohol. From one to five per cent of alcohol thus added has been found to be very effective in preventing the return of taste and odor to castor oil, and alcohol in quantities even less than one per cent would accomplish the same result. The other lower alcohols, except methyl alcohol, can be used similarly and with equally effective results, and glycerine, which chemically considered is also an alcohol, serves the same purpose. For the purpose of the present invention the alcohols and glycerine are regarded as reducing agents which serve as inhibitors or negative catalyzers.

The small amounts of alcohol or glycerine when added to the oil do not effect its appearance or other characteristics either physical or therapeutic. The added substances serve, however, in some manner to prevent the formation of the ingredients of castor and cod-liver oil which give them their characteristic odor and taste. Alcohol and glycerine do not lose their effectiveness after exposure of the oil to the atmosphere for extended periods and consequently oils that have been freed from odor and taste can be preserved indefinitely by adding these substances in a tasteless and odorless condition.

Among the reducing agents, inhibitors, or negative catalyzers, which may be used to replace alcohol or glycerine, are liquid petrolatum, sugar acetates, gallic acid, pyrogallic acid, oxalic acid, benzyl alcohol, benzyl aldehyde, vanillin, and hydroxylamine hydrochloride. Other and well known reducing agents and anticatalysts can be employed for the same purpose, and when used in substantially the same proportion as in the case of alcohol and glycerine these agents will prevent the return of taste and odor to castor and cod-liver oil. No explanation of this effect can be given as it does not necessarily depend upon the reducing nature of the substance. As has been noted already, substances which are not ordinarily considered to be reducing agents are quite as effective, and furthermore the effect of the reducing agents does not disappear, so far as I have observed, though this might be expected if it were assumed that they act as oxygen-absorbers to prevent the effect of oxygen on the oil. The preservation accompished by the addition of reducing agents to the oil is, so far as has been observed, indefinite.

My invention provides a simple and inexpensive method for preserving castor, cod-liver and other oils which have been rendered tasteless and odorless. The addition of inhibiting agents can be practiced either by itself or in conjunction with packing under inert gases. Thus, in the small containers furnished to the trade the oil, if treated as hereinbefore described, will remain tasteless and odorless even though the container is repeatedly opened and the contents is thus exposed to the atmosphere. The invention thus permits the packaging and marketing of castor oil, cod-liver oil and the like, in a tasteless and odorless form and will, therefore, encourage the use of oils which are otherwise objectionable to the consumer.

It is obviously impossible to set forth herein all of the agents which may be utilized for the purposes of the present invention. Nevertheless I desire to claim the method of preserving oils as herein described and the product containing added ingredients which affect that preservation. Within the scope of the accompanying claims various changes may be made without departing from the invention or sacrificing any of the advantages thereof.

I claim:

1. The product comprising castor oil from which the odor and taste have been removed and containing a relatively small amount of alcohol which acts to prevent such change in the composition of the oil as would cause recurrence of the odor and taste.

2. The product comprising castor oil from which the odor and taste have been removed and containing a relatively small amount of ethyl alcohol which acts to prevent such change in the composition of the oil as would cause recurrence of the odor and taste.

In testimony whereof I affix my signature.

FERDINAND W. NITARDY.